April 22, 1941.   F. TURRETTINI   2,239,259
MACHINE TOOL
Filed April 25, 1939
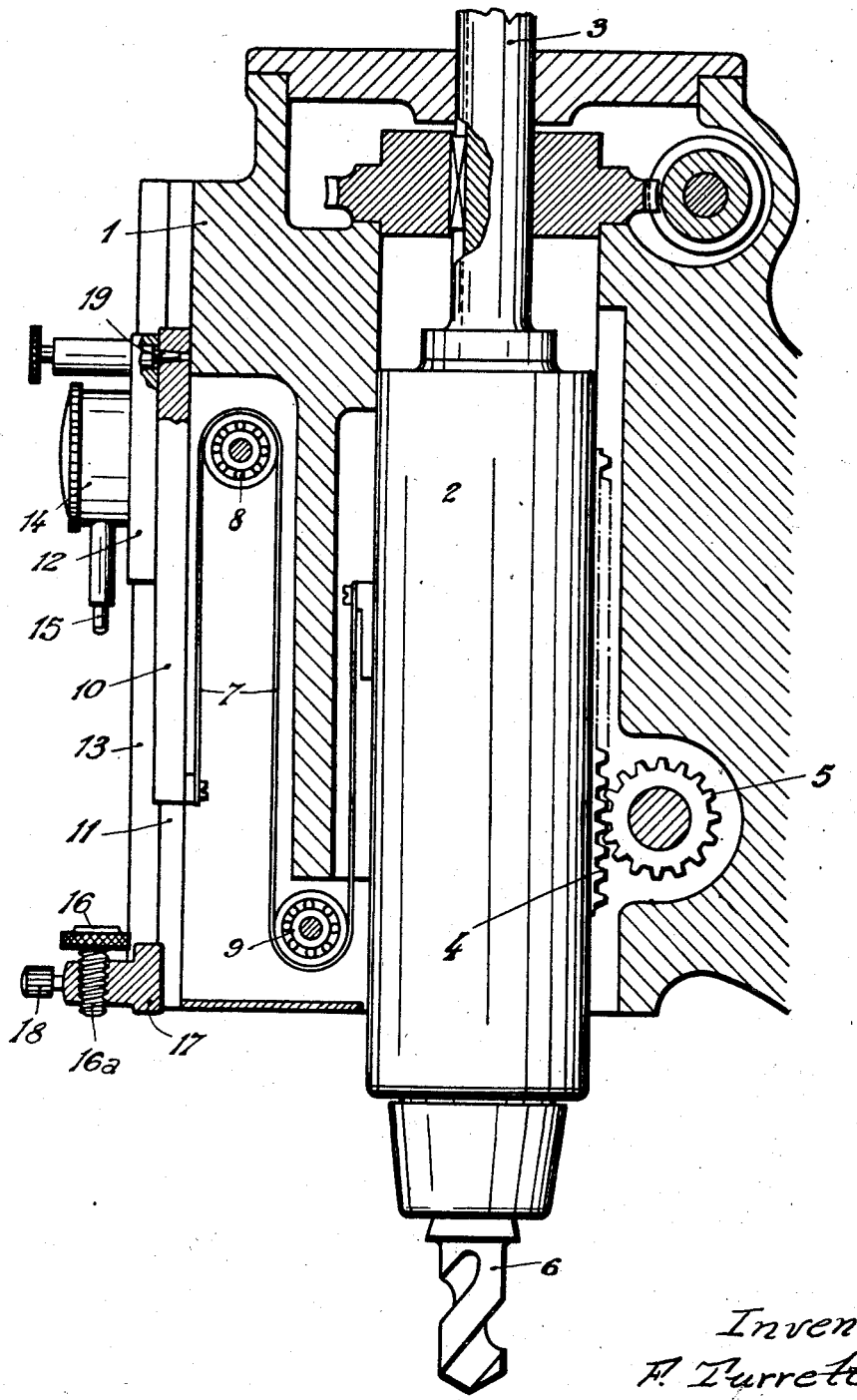
Inventor,
F. Turrettini
By Glascock Downing & Seebold
Attys.

Patented Apr. 22, 1941

2,239,259

UNITED STATES PATENT OFFICE 2,239,259

MACHINE TOOL

Fernand Turrettini, Bellevue-Geneva, Switzerland, assignor to Societe Genevoise d'Instruments de Physique, Geneva, Switzerland, a firm of Switzerland Application April 25, 1939, Serial No. 270,007
In Switzerland May 2, 1938

2 Claims. (Cl. 33—181)

The present invention relates to machine tools and more particularly to a type thereof comprising a rotatable tool spindle which is displaceable along its axis and a slide intended for measuring this axial feed of the spindle while being adapted to move along a guideway externally on the support of the spindle and parallelly to the latter over the same feed length over which the spindle is displaced.

The object of the invention is the provision of a flexible, although non-extensible pulling organ connecting the tool spindle with the slide for imparting the axial spindle motion upon the slide, and the provision of at least one transmission device over which said connecting organ is passing.

In the accompanying drawing one embodiment of the invention is illustrated by a schematic view.

The single figure is a vertical section thereof along the axis of the tool spindle.

In this figure: 1 is the holding spindle frame, 2 is the quill, and 3 is the turning tool holding spindle, the rack 4 and the pinion 5 control the motion of the quill 2 and must overcome the axial reaction of the boring tool 6. The motion of the quill 2 is transmitted to a slide 10 which is movable in the guideways 11 of the holding spindle frame 1 by means of a steel strip 7 which passes over two idlers 8 and 9 provided with ball bearings, and one extremity of which is attached to the slide 10, whereas the other one is attached to the quill 2. The slide moves in the guideways 11 for the same feed length as the quill 2, and on account of the idlers 8 and 9, in the same direction, a matter which from the synoptical point of view is of advantage. The steel strip has only a small effort to transmit and the two idlers 8 and 9 being provided with ball bearings, the slide 10 will exactly reproduce the axial displacements of the quill 2. The tension of the strip 7 is obtained by the weight of the slide; should this latter move horizontally a suitable spring would be foreseen.

In front of the slide 10 a carriage 12 is arranged which moves in guideways 13 parallel to those 11 of the slide 10. This slide is provided with a dial indicator 14, the feeler 15 of which co-operates with a small table 16 arranged for placing upon it the setting parallel gauge blocks. The position of the abutment table 16 is controlled by a micrometer setting screw 16a penetrating in the tapped hole of the slide 17 which moves also in the guideways 13 and can be locked at any point of the guideways by a clamping button 18.

For setting, the slide 12 is made solid to the slide 10 by means of spring piston 19; in lifting the plug 19 the carriage 12 is stopped and is thus not unnecessarily submitted to wear.

I claim:

1. In a machine tool, a spindle support, an axially displaceable and rotatable tool spindle, a quill rigid with said spindle for axial displacements, a slide movable along a guideway disposed externally on the support and parallelly to the spindle axis, a flexible, although non-extensible pulling organ connecting said slide with the quill for imparting equal feed from the sleeve upon the slide, at least one transmission device over which said flexible pulling organ is passing, a carriage displaceable on the spindle support parallelly to the slide and adapted to be temporarily fixed to the latter, and a dial indicator disposed on said carriage to allow measuring of the feed.

2. In a machine tool, a spindle support, an axially displaceable and rotatable tool spindle, a quill rigid with said spindle for axial displacements, a slide movable along a guideway disposed externally on the support and parallelly to the spindle axis, a flexible, although non-extensible pulling organ connecting said slide with the quill for imparting equal feed from the sleeve upon the slide, at least one transmission device over which said flexible pulling organ is passing, a carriage displaceable on the spindle support parallelly to the slide and adapted to be temporarily fixed to the latter, an abutting body mounted on the support and being displaceable in the same directions as said carriage, a micrometer setting screw carried by said body for accurate adjustment of the position of the abutment, and a dial indicator disposed on said carriage and adapted to co-operate with said abutment for measuring the feed.

FERNAND TURRETTINI.